United States Patent
Fittz et al.

(10) Patent No.: US 6,219,398 B1
(45) Date of Patent: Apr. 17, 2001

(54) HEATED JUNCTION THERMOCOUPLE CABLE ARRANGEMENT

(75) Inventors: John H. Fittz, Granby, CT (US); Robert H. Mauldin, Cannoga Park, CA (US)

(73) Assignee: CE Nuclear Power LLC, Windsor, CT (US)

( * ) Notice: Subject to any disclaimer, the term of this patent is extended or adjusted under 35 U.S.C. 154(b) by 0 days.

(21) Appl. No.: 09/122,581

(22) Filed: Jul. 28, 1998

(51) Int. Cl.[7] .................................................. G21C 17/00
(52) U.S. Cl. .......................... 376/245; 376/247; 376/258; 376/259
(58) Field of Search ................................... 376/247, 258, 376/259, 245

(56) References Cited

U.S. PATENT DOCUMENTS

| 3,210,720 |   | 10/1965 | Harris et al. ........................... 439/518 |
|---|---|---|---|
| 3,280,627 | * | 10/1966 | Cousins et al. ......................... 73/295 |
| 3,632,964 | * | 1/1972 | Dapot .................................. 219/209 |
| 3,688,244 |   | 8/1972 | Savoca et al. ......................... 439/282 |
| 3,885,849 |   | 5/1975 | Bailey et al. .......................... 439/518 |
| 4,323,760 | * | 4/1982 | Greenway et al. .................... 219/364 |
| 4,440,717 | * | 4/1984 | Bevilacqua et al. .................. 376/247 |
| 4,506,140 | * | 3/1985 | Armstrong ............................ 219/315 |
| 4,592,230 | * | 6/1986 | Waring et al. ......................... 73/295 |
| 4,624,582 | * | 11/1986 | Banda et al. .......................... 374/181 |
| 4,629,269 |   | 12/1986 | Kailus .................................. 439/587 |
| 4,653,839 |   | 3/1987 | Powell ................................. 439/660 |
| 4,741,209 | * | 5/1988 | McCulloch ............................ 73/295 |
| 4,758,175 |   | 7/1988 | Didier et al. ......................... 439/281 |
| 4,810,209 |   | 3/1989 | Punako et al. ........................ 439/589 |
| 4,859,076 | * | 8/1989 | McQueen .............................. 374/10 |
| 4,901,061 | * | 2/1990 | Twerdochlib ........................ 340/604 |
| 4,904,208 |   | 2/1990 | Powell et al. ........................ 439/654 |
| 4,965,041 | * | 10/1990 | Becker ................................ 376/258 |
| 4,977,385 | * | 12/1990 | McQueen .............................. 338/24 |
| 4,994,780 | * | 2/1991 | McQueen .............................. 338/24 |
| 5,117,216 | * | 5/1992 | McQueen .............................. 338/24 |
| 5,134,772 | * | 8/1992 | McQueen .............................. 29/611 |
| 5,211,904 | * | 5/1993 | Oosterkamp ........................ 376/258 |

* cited by examiner

*Primary Examiner*—Michael J. Carone
*Assistant Examiner*—Jack Keith
(74) *Attorney, Agent, or Firm*—Rader, Fishman & Grauer

(57) ABSTRACT

An improved heated junction thermocouple cable arrangement for use with a nuclear reactor heated junction thermocouple having sensors with an unheated thermocouple, a heated thermocouple, and a heater coil, shares power conductors between multiple heater coils. The thermocouple conductors are separated from the power conductors to eliminate the possibility of interference with the thermocouple conductor signals. The heater coils are ganged in parallel and if one heater coil fails, power is still supplied to the remaining heater coils connected to a pair of power conductors.

7 Claims, 2 Drawing Sheets

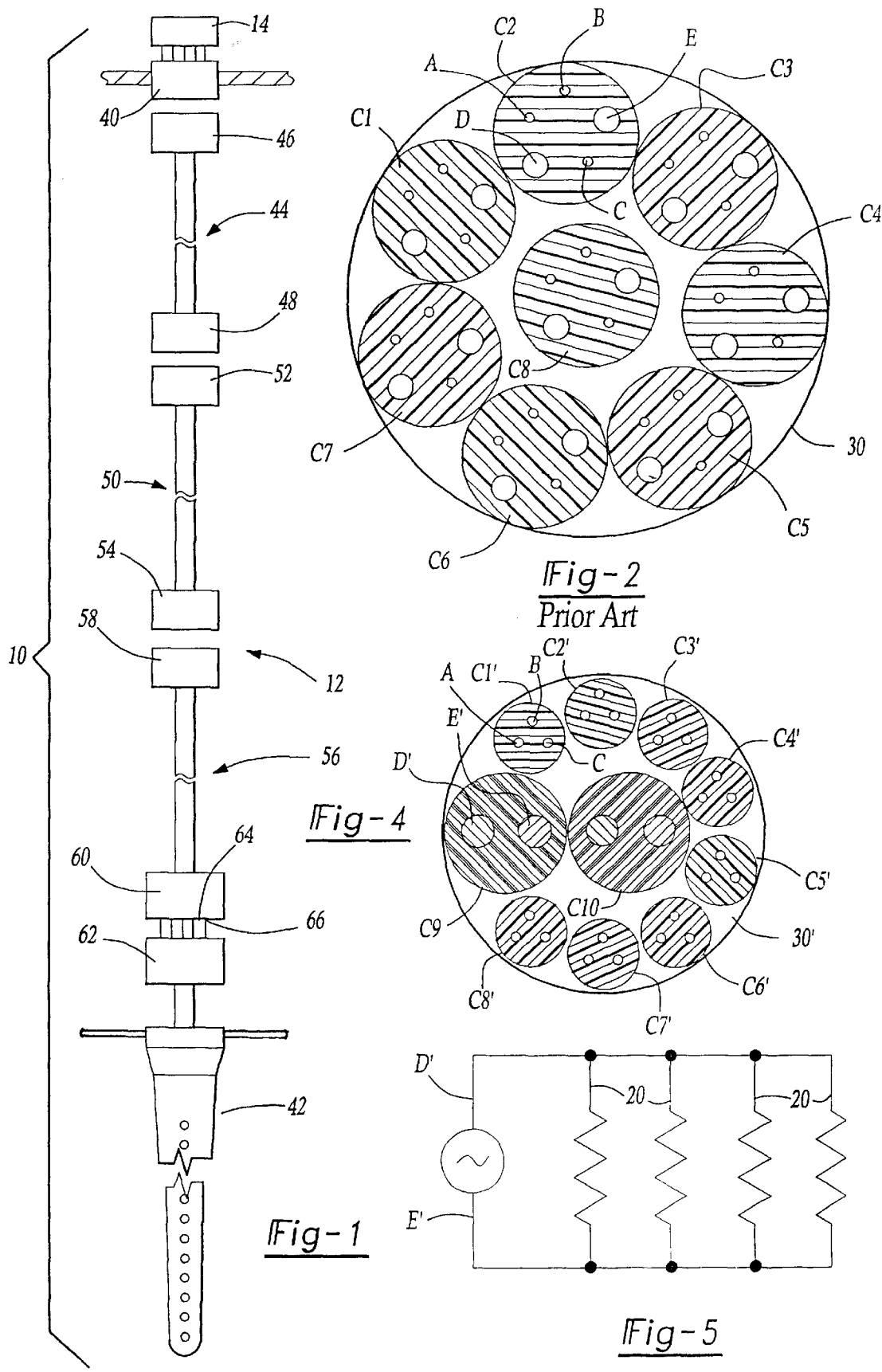

HEATED JUNCTION THERMOCOUPLE CABLE ARRANGEMENT

FIELD OF THE INVENTION

The present invention relates to an improved heated junction thermocouple cable arrangement for use with a nuclear reactor heated junction thermocouple level measurement system.

BACKGROUND OF THE INVENTION

When a pressurized water nuclear reactor is first activated after a shutdown, the reactor vessel is completely filled with a fluid coolant such as water. During nuclear reactor operation, the fluid coolant is circulated through the core to remove the generated heat. During normal reactor operation the coolant remains in a liquid state as it passes through the core. During abnormal operation, such as when there is a leak in the coolant system, the fluid coolant within the reactor vessel may change state to become a two-phase mixture of liquid and gas.

A heated junction thermocouple level measurement system with a plurality of sensors is placed within the reactor vessel and located in the upper guide structure. Each sensor includes a heated thermocouple, an unheated thermocouple, and a heater coil. The system is used to determine if liquid coolant is present above the reactor core at the level of each sensor.

Typically, a heated junction thermocouple level measurement system has eight completely separate sensors. The sensors are typically vertically spaced by equal increments in the reactor vessel between the fuel alignment plate and the reactor vessel head to give a coolant level indication over the entire height above the reactor core.

Five separate wires must be connected to each sensor to provide the measurements from the thermocouples and to provide electricity to the coil heater.

The forty wires making up the eight sensors engage the reactor vessel wall by means of a penetration connector. The five wires associated with each of the eight sensors are typically combined into a single cable. Preferably, the cable is mineral insulated, meaning that the cable is manufactured from completely inorganic material. Typically, the cable includes a copper-lined stainless steel sheath and conductors insulated with a mineral oxide such as silicon dioxide. Such components help ensure that the cable is able to withstand the effects of extremely high temperatures such as those associated with nuclear combustion and is still fully usable afterwards.

The eight sensors are then connected to a heated junction thermocouple probe by means of one or more containment, bridge, and head lift rig cables. A containment conduit containing containment cable engages the penetration connector. A bridge conduit engages the containment conduit. A head lift rig conduit engages the bridge conduit. Finally, the probe engages the head lift rig conduit. The cables provide the necessary power for the eight heaters and connect the other wires to signal processing and display equipment.

In one prior art embodiment, eight separate containment, bridge and head lift rig cables are used for each of the sensors. In a second prior art embodiment only one each of a containment, bridge, and head lift conduit are used.

Each free end of the conduits includes a connector adapted to engage a mating connector. A total of 40 pins or sockets are required at each conduit end to connect the forty different wires from each of the sensors with the heated junction thermocouple probe.

There are a number of significant drawbacks with the current heated junction thermocouple cable arrangement. The requirement of having forty separate wires requires either the use of individual very large and unmanageable containment, bridge, and head lift conduits or a significant number of smaller conduits, each of which each must be separately manipulated and located. Problems with cable labeling and clutter are greatly increased when multiple conduits are used. Yet, the ability to be able to easily manipulate and locate the heated junction thermocouple cable arrangement is of critical importance during reactor refueling when time spent in the so-called "hot" region of the reactor vessel must be minimized.

There are also significant drawbacks associated with requiring forty pins and sockets to mate the various wires with corresponding conduits. There is a constant trade off between connector size and the number of pins. As connectors become smaller, so do problems with pin and socket reliability. For example, it becomes easier to bend or distort the pins when handling the connectors or when mating or separating the connectors. Also, it is not often possible to easily replace a connector with damaged pins. This is particularly true if the number of circuits passing through the connector is large or if the shell is hermetically sealed to the interfacing instrument or conduit. However, if connectors are too big, the ability to move the associated conduits is compromised. Both damaged pins and bulky conduits also undesirably increase time spent in the "hot" zone of the reactor vessel.

There are also issues raised by having eight independent cables, each cable having the five wires discussed above. The connectors are very small and are easily damaged during the disconnection and connection process. Combining power wires with sensor wires in the same cable increases the potential for electrical interference with the sensor signals carried by the remaining three wires in the cable. Further, the need for additional insulation in each cable for increased insulation resistance adds to the bulk of the cable and the difficulty in handling the cables.

SUMMARY OF THE INVENTION

The present invention is directed to a nuclear reactor heated junction thermocouple level measurement system having a plurality of sensors. Each sensor includes both an unheated thermocouple and a heated thermocouple. A heater coil is placed adjacent the heated thermocouple. There is a distinct thermocouple conductor of a first polarity associated with each thermocouple and a thermocouple conductor of the opposite polarity shared between the thermocouples. Two power conductors are used to supply electricity to the heater coil.

There is a plurality of thermocouple sensor cables, each of the sensor cables associated with the thermocouples of a single sensor. There is also a plurality of power cables. A power cable provides electricity to more than one heater coil, the heater coils associated with a power cable ganged in parallel such that if one heater coil fails, the rest still receive power.

By having a power cable separate from a sensor cable, prior art problems associated with the power conductors potentially affecting the sensor signals carried from the thermocouples are eliminated.

In a preferred embodiment, all of the power cables and sensor cables are received in a single flexible metal conduit. For the same number of sensors, the reduction in the number of wires providing power to the heater coils provides a number of significant advantages. A smaller conduit is more manageable than either eight conduits of five wires each or a single conduit with the eight five-wire cables contained in the flexible sheath known in the prior art. Opposite ends of a conduit include a connector having either pins or sockets.

Pins may be easily bent or distorted. The likelihood of damage to the pins is reduced if the number of pins is reduced.

In a preferred embodiment of the invention, there are eight sensors associated with a heated junction thermocouple sensor. Two pairs of power wires are associated with two sets of four heater coils and three sensor wires are associated with each of the sensors. Thus, penetration connectors to containment cable and to the bridge and head rig cables have either 28 sockets or pins. A containment conduit having connectors at either end engages the penetration connector. A bridge conduit having connectors at either end engages the containment conduit. A head lift rig conduit having connectors at either end engages both the bridge conduit and an existing heated junction thermocouple probe. The head lift rig conduit acts as a transition conduit having 28 pins or sockets in the connector engaging the bridge conduit and 40 pins or sockets in the connector engaging the probe. Jumpers connect select pins or sockets of the 40 pin or socket connector such that power to the probe is transitioned from four wires to sixteen wires.

BRIEF DESCRIPTION OF THE DRAWINGS

The features and inventive aspects of the present invention will become more apparent upon reading the following detailed description, claims, and drawings, of which the following is a brief description:

FIG. 1 is a planar view of a heat junction thermocouple cable arrangement disposed between a probe and a penetration connector positioned in the containment vessel.

FIG. 2 is a prior art cross-sectional view of a conduit having eight cables for eight separate sensors of a heat junction thermocouple system, each cable including two power wires for a heater coil, two positive thermocouple conductors and one negative thermocouple conductor.

FIG. 4 is a cross-sectional view of an embodiment of the present invention having ten cables, two of the cables devoted to providing power to each of the sensor heater coils and the remaining eight cables carrying the thermocouple conductors.

FIG. 5 is a circuit diagram showing the connection of four of the heater coils in parallel.

DETAILED DESCRIPTION OF A PREFERRED EMBODIMENT

Figure 3:
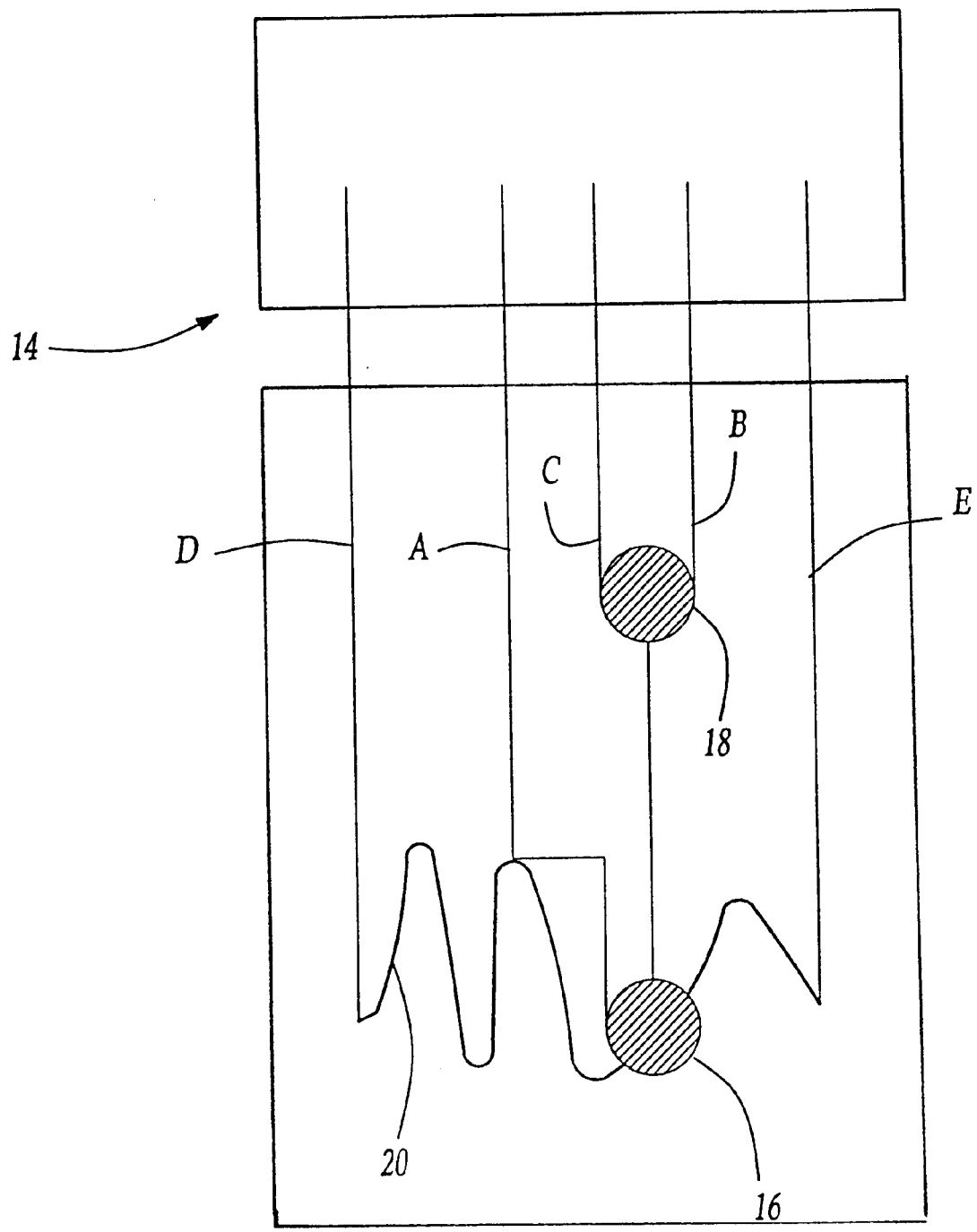
FIG. 3 is a prior art schematic view of a sensor forming a portion of a heated junction thermocouple level measurement system with a heated thermocouple and an unheated thermocouple.

As illustrated in FIG. 1, a heated junction thermocouple level measurement system 10 comprises a heated junction thermocouple cable arrangement 12 and a plurality of sensors in the probe 42.

As best shown in prior art FIGS. 2 and 3, five separate wires A, B, C, D and E must be connected to each sensor assembly 14. Two of the wires, A and C, comprise thermocouple conductors of a first polarity, usually positive. A positive thermocouple conductor is typically formed from a $Ni_{90}/Cr_{10}$ thermocouple alloy sold under the tradename Chromel®. A negative thermocouple conductor is typically formed from a $Ni_{95}Al+Mn+Si_5$ thermocouple alloy sold under the tradename Alumel®. The first thermocouple conductor A of the first polarity forms a component of heated thermocouple 16 while the second conductor C of the same polarity forms a component of the unheated thermocouple 18. A third wire B comprises a thermocouple conductor of the opposite polarity. The conductor B is typically shared between both the heated and unheated thermocouples 16, 18.

The remaining two wires D and E are typically nickel clad copper and act as positive and negative power conductors providing electricity to heater coil 20.

To prevent inaccurate readings, the heated and unheated thermocouples 16, 18 of each sensor 14 are physically displaced from one another so that heat from the heater coil 20 positioned next to the heated thermocouple 16 does not affect the voltage generated by the unheated thermocouple 18.

The heated and unheated thermocouples 16, 18 are monitored for both the absolute temperatures of the thermocouples as well as the differential temperature between the two thermocouples making up a sensor 14. The net voltage generated by each of the thermocouples 16, 18 are a function of the temperature difference between them. The heated thermocouple 16 will generate a voltage representative of its temperature. The unheated thermocouple 18 will also generate a voltage representative of its temperature.

When liquid coolant surrounds both the thermocouples 16, 18 the heat generated by the heater coil 20 will be transferred to the surrounding coolant. Therefore, the temperature of both thermocouples will remain essentially identical. Since the voltage produced by the heated thermocouple opposes the voltage produced by the unheated thermocouple, the net voltage should be small.

When there is an absence of liquid coolant surrounding both the thermocouples 16, 18 the heat produced by the heater coil 20 does not transfer as well to the surrounding gaseous coolant. As a result, the heated thermocouple temperature will rise above the unheated thermocouple temperature and a much larger net voltage results between the two thermocouples 16, 18.

The thermocouple wires A, B and C have an outer diameter in the range of approximately 0.01 to 0.02 inches and more specifically an outer diameter of 0.015 inches. The prior art heater coil wires D and E have an approximate diameter of 0.040 inches.

The five wires A through E associated with each of the eight sensors 20 are typically combined into a single cable $C_1$ through $C_8$ as best shown in prior art FIG. 2. The outer diameter of cables $C_1$ through $C_8$ is approximately 0.25 inches. In turn one or more cables $C_1$ through $C_8$ are secured within a conduit 30. Typically, each conduit 30 is formed from a flexible metal hose or sheath sold under the tradename Penflex®. If all eight cables are secured within a single conduit 30 the outer diameter of the resulting conduit is more than 0.75 inches.

In direct contrast to the teachings of the prior art, the present invention significantly reduces the number of wires from forty to twenty-eight, as shown in FIG. 3. The sixteen separate heater coil conductors D and E traditionally associated with cables $C_1$ through $C_8$ of the prior art are reduced to a total of four wires D' and E'. The wires representing power conductors D' and E' have a diameter in the range of approximately 0.06 to 0.09 inches and more specifically approximately 0.08 inches. The thickness of wires D' and E' permit greater power to be transmitted through the wires. One set of wires D' and E' are isolated within a separate cable $C_9$ while the other set of wires D' and E' are isolated within a separate cable $C_{10}$. An advantage of having the wires D' and E' separated from the sensor wires A, B, and C is that the wires D' and E' have a tendency to interfere with the sensor signals if the five wires are shared within a single cable.

Cables $C_9$ and $C_{10}$ have an approximate diameter of approximately 0.31 inches. The remaining eight cables $C_1'$ through $C_8'$ only have three wires, namely the thermocouple conductors represented by wires A, B and C. As a result, the corresponding cables $C_1'$ through $C_8'$ have an outer diameter of approximately 0.11 inches.

It is advantageous to have cables $C_1'$ through $C_8'$ with a smaller diameter, namely 0.11 inches as compared to approximately 0.25 inches. Cables $C_1'$ through $C_8'$ are more easily bent and manipulated than the prior art five wire cables $C_1$ through $C_8$.

If all ten cables are secured within a single conduit 30' the outer diameter of the resulting conduit is approximately 0.55 inches, significantly less than the greater than 0.75 inches required in the prior art. The mass is reduced by approximately 30%. Having a smaller and lighter conduit promotes installation and handling particularly in the "hot" area of a nuclear reactor. The decrease in conduit size and mass is achieved even though the outer diameter of wires D' and E' is at least three and preferably four times greater than that of wires A, B, and C.

Further, unlike the prior art, the eight heater coils 20 are broken into two sets of heater coils, one set provided electricity by wires D' and E' of cable $C_9$ and the other set provided electricity by wires D' and E' of cable $C_{10}$.

As best shown in FIG. 5, each set of the heater coils 20 is ganged in parallel. The wires D' and E' are very strong and able to resist potential damage while also providing adequate power to the heater coils 20.

Even if one of the heater coils fails, the use of wires D' and E' still permits the remaining heaters to function. The total resistance in the circuit R(T) is typically equal to the resistance of each heater divided by the number of heaters or R(H)/4. Thus, if one of the heaters coils 20 fail and becomes an open circuit, the total resistance increases to R(H)/3. The power to the heaters is only reduced by 25% with current decrease according the formula I=V/R and can be compensated for if necessary by increasing voltage.

As best shown in FIG. 1, having fewer wires also promotes the ability to connect various cables together between containment penetration connector 40 and heated junction thermocouple probe 42. A containment conduit 44 includes a 28 pin or socket connector 46 and 48 at opposite ends, connector 46 mating with penetration connector 40. In turn, containment conduit 44 mates with a bridge conduit 50, the bridge conduit having a 28 pin or socket connector 52 and 54 at opposite ends, connector 52 mating with connector 48. Bridge conduit 50 also mates with a head lift rig conduit 56, the lift rig conduit having a 28 pin or socket 58 and a 40 pin or socket 60. In a preferred embodiment, the lift rig conduit 56 acts as a transition conduit, allowing a prior art probe 42 with a 40 pin or socket 62 to mate with a corresponding 40 pin or socket 60. Socket 60 has jumpers 64 between select pins 66 in the backshell of the connector to provide sixteen pins or sockets for the power conductors which are reduced to four in the cable conduit 56. Alternatively, the mating socket may have the jumpers.

The transition between a 40 pin or socket connector to a 28 pin or socket connector preferably takes place as close to the "hot" zone of the reactor vessel penetration by probe 42 as possible. By having fewer conductors in the cable near the reactor vessel, the time necessary and problems associated with completing the connection or disconnection operation are significantly decreased. There is less likelihood of bending or breaking pins when handling bridge conduit 50 and head lift rig conduit 56.

The disclosed embodiments and examples are given to illustrate the present invention. However, they are not meant to limit the scope and spirit of the present invention. Therefore, the present invention should be limited only by the appended claims.

What is claimed is:

1. In a nuclear reactor heated junction thermocouple level measurement system having a plurality of sensors, each sensor including both an unheated and a heated thermocouple, and a heater coil adjacent the heated thermocouple, wherein two thermocouple conductors of a first polarity are associated with each thermocouple and one thermocouple conductor of an opposite polarity is shared between the heated and unheated thermocouples, the improvement comprising:

a heated junction thermocouple cable arrangement including:

a plurality of thermocouple sensor cables, each of said sensor cables including one of said plurality of sensors; and a plurality of heater coil power cables, each of said heater coil power cables including one positive power conductor and one negative power conductor, wherein said power conductors provide electricity to a plurality of heater coils electrically connected in parallel such that the failure of a first heater coil does not prevent operation of a second heater coil, and wherein there are eight sensors requiring at least twenty-eight wires within said conduit, said twenty-eight wires comprising four wires associated with two heater coil power cables and twenty-four wires associated with the thermocouples, and wherein four heater coils are electrically connected in parallel between one positive power conductor and one negative power conductor.

2. In a nuclear reactor heated junction thermocouple level measurement system as recited in claim 1, wherein the heated junction thermocouple cable arrangement includes a separate transition conduit having a pin or socket connector at opposing ends, one connector having sixteen pins or sockets corresponding to said power conductors for each of the heater coils and a second connector having four pins or sockets for all of the heater coils such that the number of said power conductors is reduced from sixteen to four.

3. In a nuclear reactor heated junction thermocouple level measurement system as recited in claim 2, wherein said conduit includes connectors at opposing ends, one of said connectors engaging a corresponding connector of said transition conduit.

4. In a nuclear reactor heated junction thermocouple level measurement system as recited in claim 1, wherein said conduit has an outer diameter of approximately 0.55 inches.

5. In a nuclear reactor heated junction thermocouple level measurement system as recited in claim 4, wherein said cables are manufactured entirely from inorganic materials.

6. In a nuclear reactor heated junction thermocouple level measurement system as recited in claim 5, wherein said cables are insulated with a mineral oxide.

7. In a nuclear reactor heated junction thermocouple level measurement system as recited in claim 2, wherein said transition conduit is a head lift rig conduit, a containment conduit being disposed between said head lift rig conduit and a penetration connector positioned in a containment wall, said bridge conduit and said containment conduit each having connectors at opposite ends such that said head lift rig conduit engages said bridge conduit and said bridge conduit engages said containment conduit.

* * * * *